United States Patent
Watanabe

(10) Patent No.: US 7,746,742 B2
(45) Date of Patent: Jun. 29, 2010

(54) OPTICAL DISC RECORDING METHOD AND OPTICAL DISC APPARATUS

(75) Inventor: Koichi Watanabe, Hachioji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 632 days.

(21) Appl. No.: 11/674,211

(22) Filed: Feb. 13, 2007

(65) Prior Publication Data

US 2008/0144458 A1   Jun. 19, 2008

(30) Foreign Application Priority Data

Dec. 15, 2006   (JP) .............................. 2006-337782

(51) Int. Cl.
*G11B 7/00* (2006.01)

(52) U.S. Cl. .................... 369/47.53; 369/116

(58) Field of Classification Search ............... 369/47.5, 369/47.51, 47.52, 47.53, 116, 47.1
See application file for complete search history.

(56) References Cited

U.S. PATENT DOCUMENTS

| | | | |
|---|---|---|---|
| 5,005,164 A * | 4/1991 | Sakamoto et al. ........ | 369/47.53 |
| 5,862,103 A * | 1/1999 | Matsumoto et al. ...... | 369/13.27 |
| 6,356,515 B1 * | 3/2002 | Kumita et al. ............ | 369/13.26 |
| 7,050,374 B2 | 5/2006 | Fukuchi et al. | |
| 2003/0039188 A1 | 2/2003 | Fukuchi et al. | |
| 2003/0156514 A1 | 8/2003 | Suzuki | |
| 2004/0037190 A1 * | 2/2004 | Suzuki et al. ............ | 369/47.51 |
| 2005/0068871 A1 * | 3/2005 | Weirauch ................. | 369/47.53 |
| 2005/0237885 A1 * | 10/2005 | Ma et al. ................. | 369/47.53 |
| 2006/0146673 A1 | 7/2006 | Shoji | |

FOREIGN PATENT DOCUMENTS

| | | |
|---|---|---|
| CN | 1407543 | 4/2003 |
| CN | 1450535 | 10/2003 |
| JP | 6-139574 | 5/1994 |
| JP | 2000-306241 | 11/2000 |
| JP | 2002-298357 | 10/2002 |
| WO | WO 2005/073961 | 8/2005 |

* cited by examiner

*Primary Examiner*—Nabil Z Hindi
(74) *Attorney, Agent, or Firm*—Antonelli, Terry, Stout & Kraus, LLP.

(57) ABSTRACT

Objectives of the present invention are to prevent a reduction in the accuracy of an OPC which would otherwise occur due to an influence of a change in temperature, and to increase the reliability of a recording data. To this end, in the OPC using a modulation, the OPC is performed with at least one of multiplication coefficients necessary for calculation changed according to temperature.

14 Claims, 14 Drawing Sheets

|  |  | Write-Once | Rewritable |
|---|---|---|---|
| Discs |  | CD-R<br>DVD±R<br>BD-R | CD-RW<br>DVD±RW<br>BD-RE |
| OPC Method | Modulation | ○ | ◎ |
| | Asymmetry | ◎ | △ |

FIG. 8

EXAMPLE OF TEMPERATURE-DEPENDENCY
OF $\kappa$ AND $\rho$ OF $\kappa$-OPC METHOD

|  | 0°C | 25°C | 50°C |
|---|---|---|---|
| $\kappa$ VALUE | $1.0 * \kappa_0$ | $\kappa_0$ | $1.05 * \kappa_0$ |
| $\rho$ VALUE | $0.95 * \rho_0$ | $\rho_0$ | $1.05 * \rho_0$ |

BEFORE IMPROVEMENT

AFTER IMPROVEMENT

BEFORE IMPROVEMENT

AFTER IMPROVEMENT

TEMPERATURE-DEPENDENCY OF $\rho$ OF $\gamma$-OPC

| TEMPERATURE | 0°C | 25°C | 50°C |
|---|---|---|---|
| $\rho$ VALUE | $0.95 * \rho_0$ | $\rho_0$ | $1.1 * \rho_0$ |

FIG. 14

| ASYMMETRY (%) | -5 | 0 |
|---|---|---|
| STANDARD VALUE OF MODULATION | M0 | M1 |
| MEASURED MODULATION | Mm0 | Mm1 |

| | Mm0<0.98*M0 | 0.98*M0≦Mm0≦1.02*M0 | 1.02M0<Mm0 |
|---|---|---|---|
| $\kappa$ VALUE | $\alpha * \kappa_0$ | $\kappa_0$ | $\beta * \kappa_0$ |
| $\rho$ VALUE | $\alpha * \rho_0$ | $\rho_0$ | $\beta * \rho_0$ |

FIG. 16

| MODULATION (%) | 35 | 40 |
|---|---|---|
| STANDARD VALUE OF ASYMMETRY | ASY0 | ASY1 |
| MEASURED ASYMMETRY | ASYm0 | ASYm1 |

| | ASYm0<0.98*ASY0 | 0.98*ASY0≦ASYm0 ≦ 1.02*ASY0 | 1.02ASY0< ASYm0 |
|---|---|---|---|
| $\kappa$ VALUE | $\alpha * \kappa_0$ | $\kappa_0$ | $\beta * \kappa_0$ |
| $\rho$ VALUE | $\alpha * \rho_0$ | $\rho_0$ | $\beta * \rho_0$ |

OPTICAL DISC RECORDING METHOD AND OPTICAL DISC APPARATUS

CLAIM OF PRIORITY

The present application claims priority from Japanese application JP 2006-337782 filed on Dec. 15, 2006, the content of which is hereby incorporated by reference into this application.

BACKGROUND OF THE INVENTION

1. Field of the Invention

The present invention relates to an optical disc recording method and an optical disc drive apparatus for driving/controlling an optical modulation waveform when recording information on an information recording medium.

2. Description of the Prior Art

As recordable optical discs, a large number of optical discs such as CD-R/RW, DVD-RAM, DVD±R/RW, Blu-ray Disc (BD)-R/RE, HD DVD have been commercialized and have widely spread among public. In a recordable optical disc apparatus, correction of recording power is performed while recording user data on each medium by using a method called an Optimum Power Control (abbreviated as an OPC), in order to record user data constantly at suitable recording power which would vary due to variable factors such as a temperature, a wavelength of light source, production variation of media and the like.

As OPC methods, the followings are known.

(1) An OPC Method Mainly Used for Write-Once Discs

As an example of an OPC method using asymmetry, Japanese Patent Application Laid-open No. Hei 6-139574 discloses an OPC technique using a method in which an asymmetry of repetitive signals of a shortest mark and space is made equal to an asymmetry of repetitive signals of a longest mark and space.

(2) OPC Methods Mainly Used for Re-Writable Discs

As an example of an OPC method using a signal modulation (or reflectance), Japanese Patent Application Laid-open No. 2000-306241 discloses an OPC technique using a method in which recording power is figured out by multiplying power by a coefficient, the power causing a change in reflectance caused by a change in recording power to be maximized. Furthermore, Japanese Patent Application Laid-open No. 2003-067925 disclose an OPC technique using a method in which recording power is figured out by using a gradient of a change in the degree of modulation caused by a change in recording power, or a gradient of a change in a γ-value.

FIG. 1 is a schematic view for describing a γ-method. In this respect, the γ-value represents a value normalized using a rate of change in the modulation and that of recording power. In FIG. 1, a solid line represents the modulation, and a broken line represents a curve describing derivative values thereof. The modulation increases as the power increases, and there is power Ptarget where the modulation sharply increases as a mark is formed. This is a method for figuring out optimum power PWO by multiplying Ptarget by ρ, since the power obtained by multiplying the power around Ptarget by a coefficient causes a margin to be maximized. This method is an index which is not sensitive to a setting offset of recording power.

As for an index of the same kind, there is a so-called κ-method. Japanese Patent Application Laid-open No. 2002-298357 describes the κ-method which is recommended in specification of BDs. A recording power control method using the κ-method is to control an optimum recording power according to: a relational characteristic between recording power figured out by trial writing and the modulation figured out from the amplitude of a readout signal of the signal recorded in the trial writing; and values of Ptarget, Mind, κ and ρ which are set in an optical disc in advance.

FIG. 2 are schematic diagrams for describing the c-method. Optimum recording power Popt is figured out as follows. First, find an estimation value within a range around the set recording power Ptarget corresponding to a specified modulation Mind on the optical disc, by calculating an equation, Sm=Mm×Pwm, as one of relational characteristics between a plurality of kinds of recording power Pwm set in trial writing, and the modulation Mm found by using the amplitude of a readout signal of a signal recorded at each Pwm. Then, find recording power Pthr in the range at which the modulation becomes zero when the relational characteristic between Pwm and Sm is linearly approximated. Finally, find the optimum recording power Popt by calculating Popt=κ×ρ×Pthr by using the previously-found Pthr and the parameters κ and ρ of the optical disc.

SUMMARY OF THE INVENTION

Recordable optical discs are classified into write-once discs, recording layers of which are made of organic dye materials and the like, and rewritable discs, recording layers of which are made of phase change recording materials and the like. Furthermore, among rewritable optical discs, there are those where importance is placed on compatibility with ROM discs, and those which have the center structures and where importance is placed on random access performance. Differences from recording materials between OPC methods are described using BD-RE and BD-R discs.

FIG. 3 is a view for showing an experimental result on a relationship between recording power of a BD-RE disc and respective estimate indices. FIG. 3A shows a relationship between recording power and jitter; FIG. 3B shows a relationship between recording power and modulation; and FIG. 3C shows a relationship between recording power and asymmetry. As for recording power, it is shown that adequate recording power is normalized as 100%.

FIG. 4 is a view for showing a similar experimental result on a relationship between recording power of a BD-R disc and respective estimate indices. Comparing the rates of change in asymmetry with respect to the changes in recording power as shown in FIGS. 3C and 4C, it can be seen that the rate of change in the rewritable BD-RE disc is relatively small while the rate of change thereof for the write-once BD-R disc is relatively large. This occurs due to differences in the characteristics of recording materials. In the rewritable BD-RE discs, recording and erasing of data occur simultaneously. For this reason, when recording power is increased to form a large mark, an effect that excess recording power (or erasing power) causes a mark to be small (erasing) also occurs simultaneously. Consequently, a change in the size of the recording mark becomes small with respect to a change in the recording power. This is the reason why the rate of change in asymmetry is relatively small with respect to the recording power. In contrast, in the write-once BD-R discs, since a mark recorded cannot be erased, when the recording power is increased, its heat energy increases and, accordingly, the size of a recording mark to be formed is also increased. This is the reason why the rate of change in asymmetry is relatively large with respect to the recording power.

As described above, asymmetry with respect to the change of the recording power, i.e. the difference of the rage of change in the size of a recording mark to be formed, also appears in the behaviors of jitters of both discs. As is clear from comparing FIG. 3A with FIG. 4A, a power margin of the BD-RE disc is large where the rate of change in the size of the recording mark with respect to the recording power is small.

Therefore, as an OPC method for a BD-RE disc where the rate of change in asymmetry is relatively small with respect to the recording power, a method is suitable in which recording power threshold $P_{thr}$ is found from modulation without using asymmetry, and in which suitable recording power is found by multiplying the power threshold thus found with a predetermined coefficient. Meanwhile, as an OPC method for a BD-R disc where the rate of change in asymmetry is relatively large with respect to the recording power, there is generally used a method in which suitable recording power is directly found by using a method of finding recording power where asymmetry is a predetermined value. However, as in the case of the BD-RE disc, it is also possible to found suitable recording power based on the modulation.

FIG. 5 is a table showing a summary of OPC methods suitable in response to a difference in recording materials. As described above, as the conventional OPC methods, those using the modulation and asymmetry are disclosed. In the above methods, the OPC method using the modulation has two features as follows.
1) The modulation indicating the formation of a long mark is a reference.
2) From a result of a power scan being smaller than optimum power, optimum recording power is found.

In other words, a long mark, which is hardly influenced by external disturbance, is not considered as a reference and, further, a situation in the vicinity of an optimum power is not considered.

Considering temperature characteristics of a medium, for example, in the κ-method, there is a possibility that multiplication coefficients (κ, ρ) used for finding optimum power from Pthr are different. When the multiplication coefficients are different for finding optimum power, the position where target recording power is located changes on a power margin. This optimum power is determined from a system margin, and whether it is high or small in excess, a system margin becomes small.

FIG. 6 is a schematic view for showing a result measured by measuring power margins of BD-RE discs for every temperature setting write power found by using the κ-method as 100%. In the κ-method, there is a tendency that, comparing with an OPC at ordinary temperature, high power is found at a low temperature, and low power is found at a high temperature. As a result, a power margin on the high power side becomes small when a temperature is low, and a power margin on the low power side becomes small when a temperature is high.

Objects of the present invention are to solve the problems of the above-described conventional technique, and to provide an OPC method and an optical disc apparatus using the method, which are always capable of determining suitable record power in response to a change in temperature.

As described above, in rewritable optical discs, since a rate of change in asymmetry is small with respect to a change in recording power, an OPC is performed based on a modulation and, thereby, the recording power is determined. However, in the OPC methods (κ-method, ρ-method) using the modulation, when the multiplication coefficients κ and ρ are fixed with respect to a change of temperature, the power found by the OPC is deviated from optimum power in some cases.

Hence, in the present invention, multiplication coefficients of the OPC method are held as multiplication coefficients which are dependent on temperature. Thus, an atmospheric temperature of an optical disc medium is measured and, using a multiplication coefficient corresponding to measured temperature, the optimum recording power is found.

Alternatively, a relationship between a standard modulation and an asymmetry equivalent amount is held as standard data, and a relationship between deviation deviated from the standard data and multiplication coefficient values of the OPC method is also held. Data patterns for power correction are practically recorded on/read out from an optical disc medium, so that a relationship between modulation and asymmetry equivalent amount is found. Based on the relationship thus found and the deviation deviated from the standard data, corrected multiplication coefficients of the OPC method is obtained. Using the coefficients, the optimum recording power is to be found.

The present invention is capable of providing an OPC method for determining suitable recording power in response to a change in temperature, and capable of providing a highly reliable recording method and an optical disc apparatus. Furthermore, the present invention is useful not only for rewritable optical discs but also for write-once optical discs.

According to the present invention, even when an ambient temperature changes, an accuracy of an OPC using the modulation can be secured, so that it is possible to secure a high reliability.

BRIEF DESCRIPTION OF THE DRAWINGS

FIG. 8 is a view for showing an example of a table of multiplication coefficients of the κ-method of the present invention at each temperature;
FIG. 14 is a view for showing an example of a table for changing multiplication coefficients of the κ-method based on the relationship between asymmetry and modulation;
FIG. 16 is a view for showing an example of a table for changing multiplication coefficients of the κ-method based on the relationship between asymmetry and modulation.

DESCRIPTION OF THE PREFERRED EMBODIMENTS

Using an embodiment, the present invention is described in detail below.

First Embodiment

Figure 7:
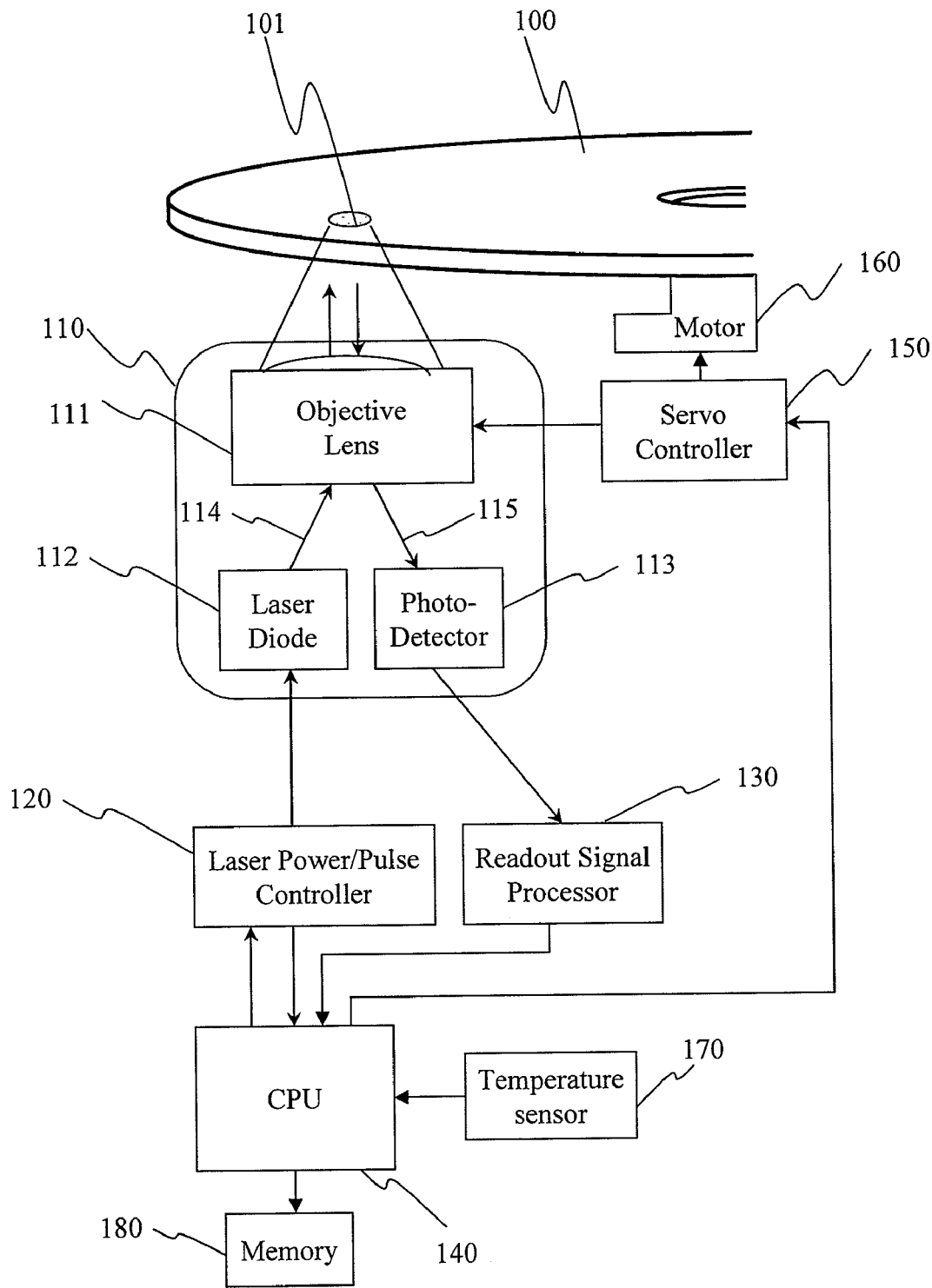
FIG. 7 is a schematic view for showing a configuration example of an optical disc apparatus of the present invention.

FIG. 7 is a schematic view for showing a configuration example of an optical disc apparatus according to the present invention. An optical disc medium 100 is rotated by a motor 160. A CPU 140 detects an ambient temperature of the optical disc medium 100 by using a temperature sensor 170. A memory 180 holds a table such as one shown in FIG. 8, and the CPU 140 calculates an OPC by using coefficients κ and ρ stored in the table. Specifically, in the present embodiment, the coefficients κ and ρ of a κ-method are caused to be temperature-dependent. In an example of FIG. 8, $κ=κ_0$ which represents a value κ at 25° C. and $ρ=ρ_0$ which represents a value ρ at 25° C. are set as referential values. When a temperature is 0° C. lower than the above, the value ρ is set to be $ρ=0.95×ρ_0$; when a temperature is 50° C. higher than the above, the value κ and the value ρ are set to be $κ=1.05×κ_0$ and $ρ=1.05×ρ$, respectively. Even at temperatures other than 0° C. and 50° C., the coefficients κ and ρ having the temperature dependency may be set in the same manner.

At the time of reading out from the optical disc medium 100, a laser power/pulse controller 120 controls electric current which is to flow to a laser diode 112 in an optical head 110, so that laser light 114 is generated in order to reach a light intensity instructed by the CPU 140. The laser light 114 is converged through an objective lens 111, so that a light spot 101 is formed on the light disc medium 100. Reflected light 115 from the light spot 101 is detected by a photodetector 113 through the objective lens 111. The photodetector 113 is formed of plural segmented photo-detecting elements. A readout signal processing circuit 130 reads out information recorded on the optical disc medium 100 by using a signal detected by the optical head 110.

At the time of recording on the optical disc medium 100, the laser power/pulse controller 120 converts predetermined recording data into predetermined recoding pulse current, and controls so that pulse light is irradiated from the laser diode 112. In the present embodiment, although recording power is set following to an OPC of the γ-method, coefficients κ and ρ used at this time are those having temperature dependency as shown in FIG. 8.

Figure 9:
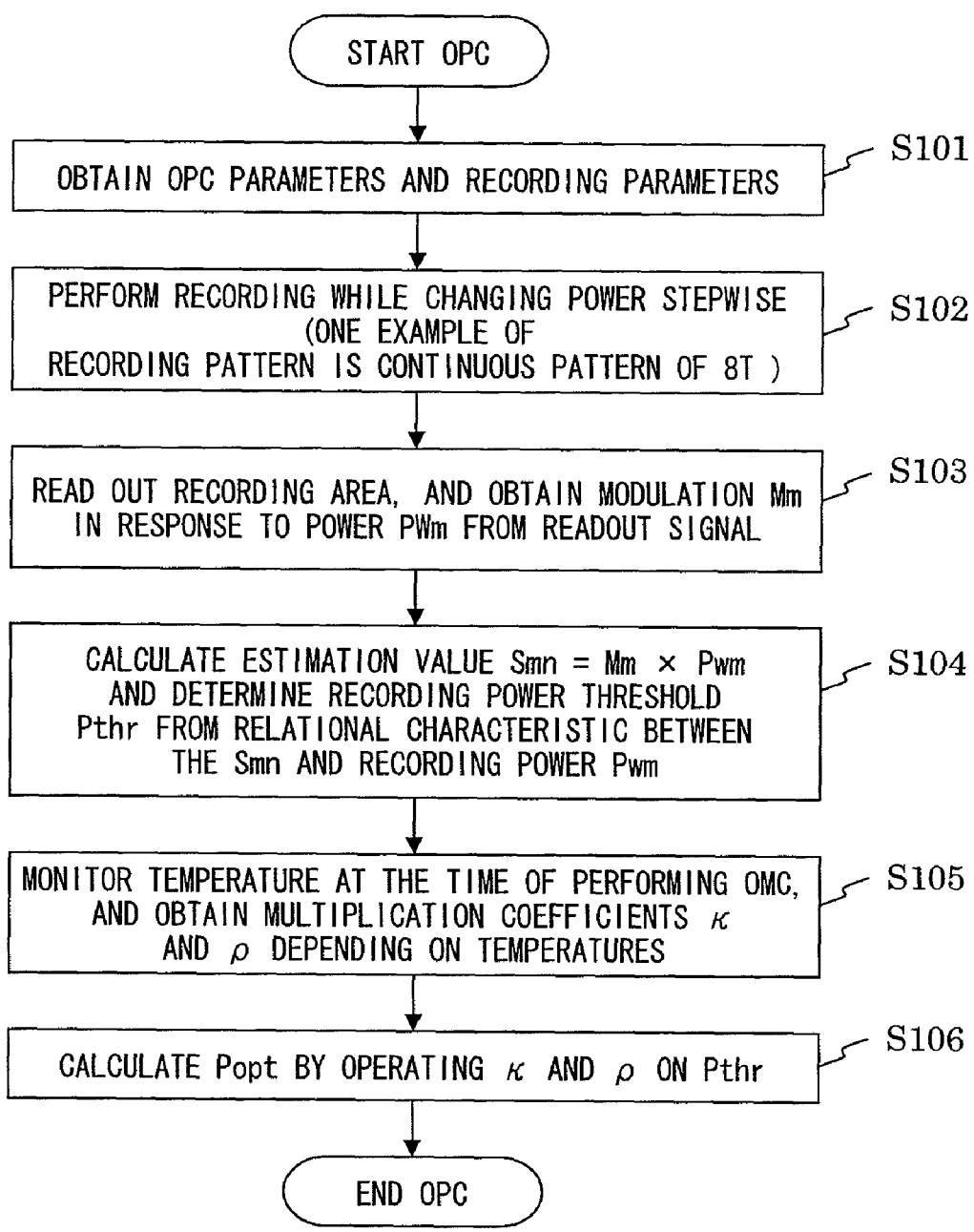
FIG. 9 is a flowchart for showing an example of a recording power determining method according to the present invention.

A method for determining recording power in the present embodiment is described with reference to a flowchart shown in FIG. 9. A sequence shown in FIG. 9 is held in the memory 180 as a program. The CPU 140 executes the sequence shown in FIG. 9 by using the program held in the memory 180, the table, and outputs from the temperature sensor 170.

First, to start the OPC, obtained are OPC parameters such as recording start power and recording termination power for a disc to be operated, and recording parameters such as power scan information and storage information (S101). Next, numerous kinds of recording power PWm are set according to a predetermined condition; and a predetermined signal pattern, e.g. an isolated 8T mark with the predetermined length, is recorded on a trial writing area of the optical disc by using respective PWm (S102).

The numerous kinds of recording power PWm are set based on mean optimum recording power which is obtained, for example, by reading mean optimum recording power on the disc, which is stored in advance in an optical recording/reading device, or by reading out mean optimum recording power which is recorded in advance on an information control area of the disc. As an example, numerous kinds of recording power setting values Dm (m is an integer, for example, m=1, 2, 3, . . . 16), which are stored in advance in an optical recording/reproduction device, are read. The numerous kinds of recording power PWm are set by using an equation, PWm=(mean optimum recording power)*Dm and respective Dm.

Next, an area where a trial writing has been performed is read out, so that a high envelope (Henv) and a low envelope (Lenv) of readout signals corresponding to respective PWm are measured, and the modulation Mm, which is defined by an equation, Mm=(Henv−Lenv)/Henv, is calculated (S103). A relationship between the modulation Mm and the corresponding recording power PWm becomes for example, those in FIGS. 2 and 3B.

Figure 1:
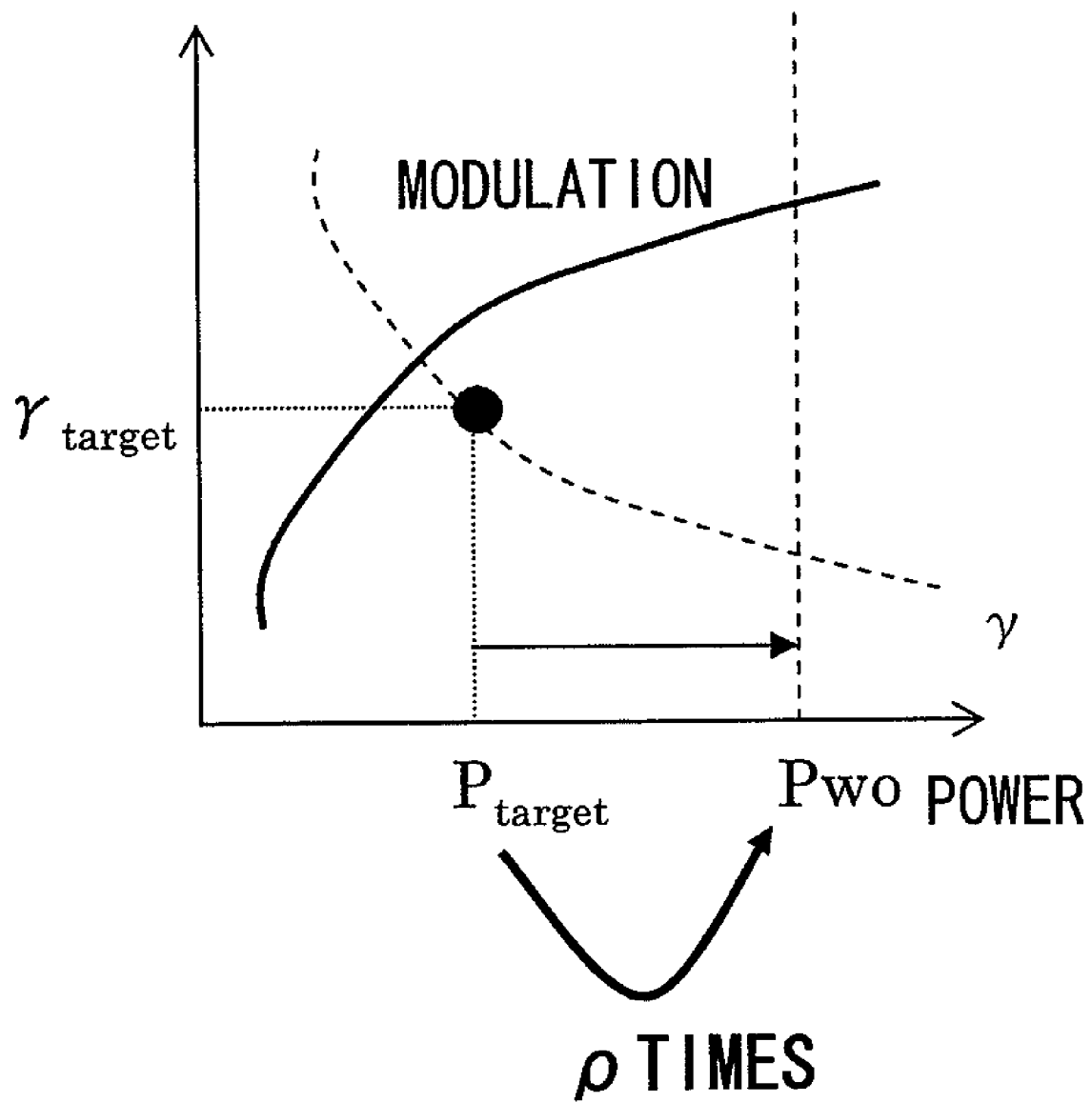
FIG. 1 is a view for describing a γ-OPC method.
Figure 2:
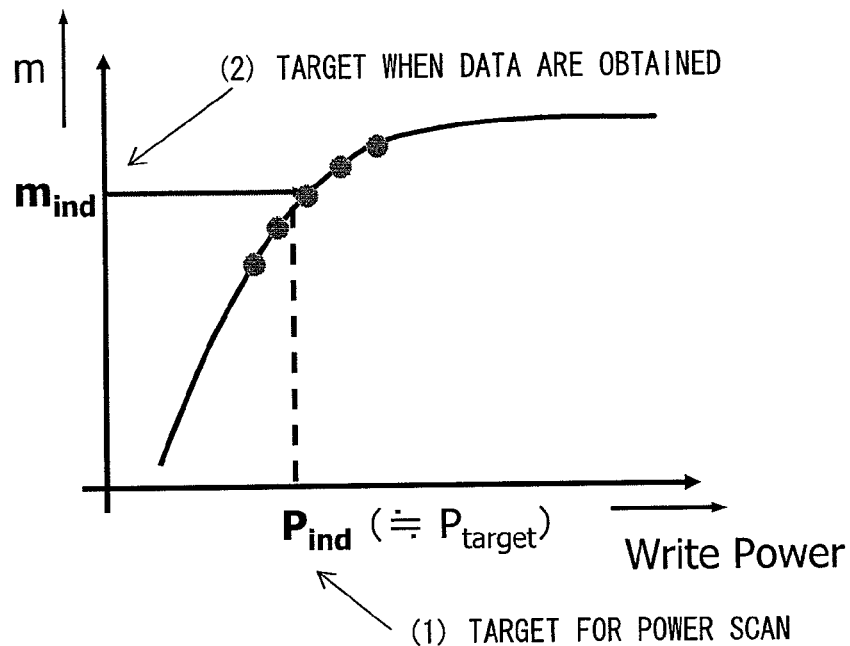
FIG. 2 is a view for describing a κ-OPC method.
Figure 2:
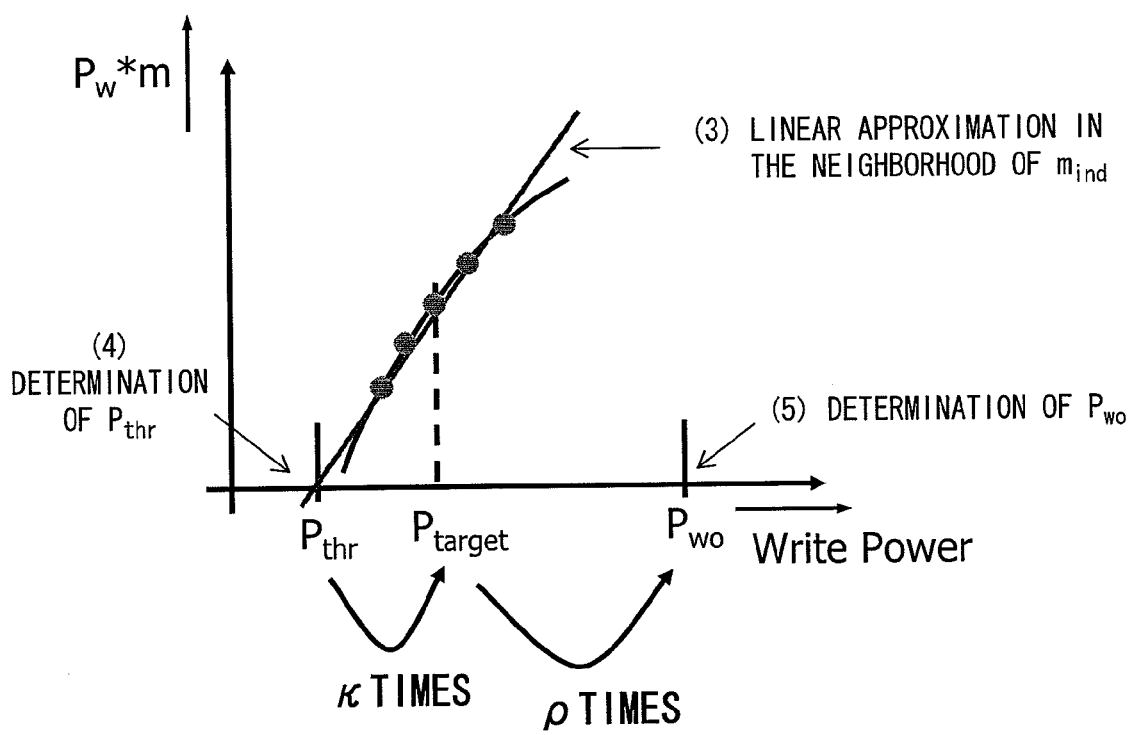
Figure 3:
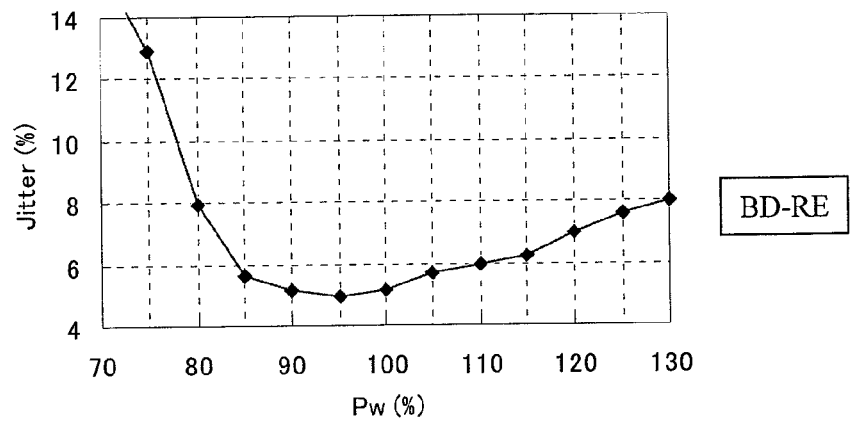
FIG. 3 is a view for showing an experimental result on a relationship between recording power for a BD-RE disc and respective estimation index.
Figure 3:
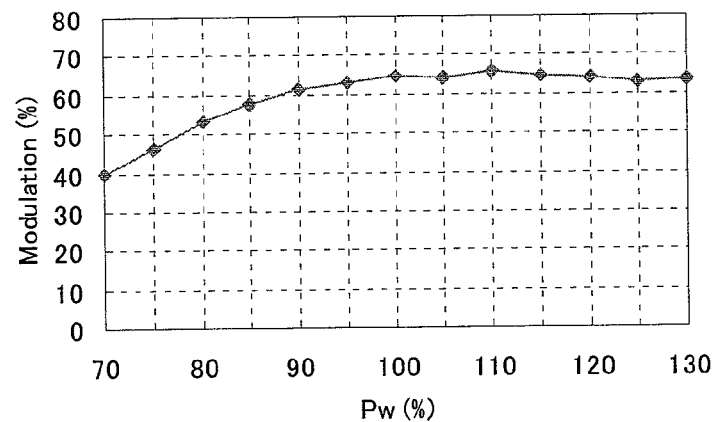
Figure 3:
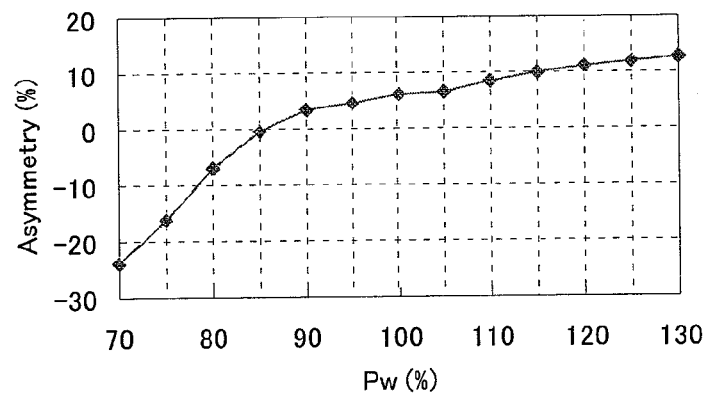
Figure 4:
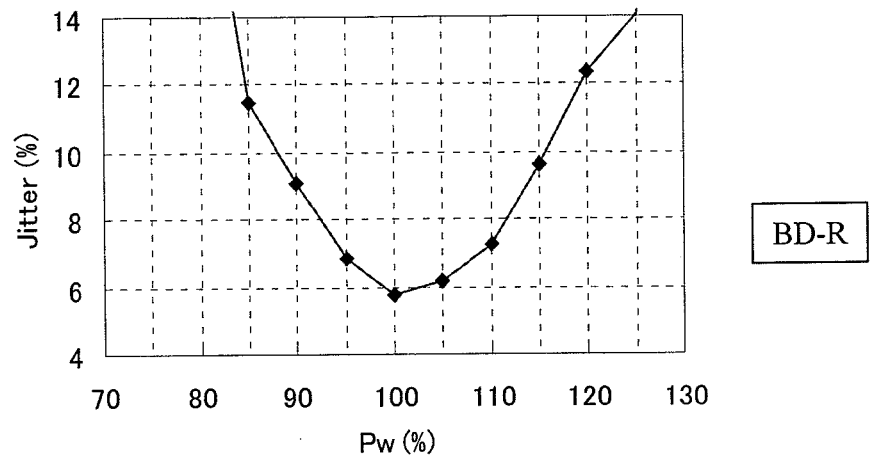
FIG. 4 is a view for showing an experimental result on a relationship between recording power for a BD-R disc and respective estimation index.
Figure 4:
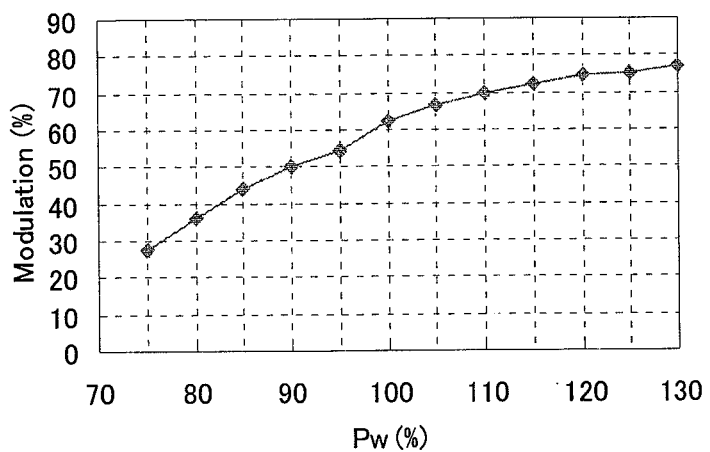
Figure 4:
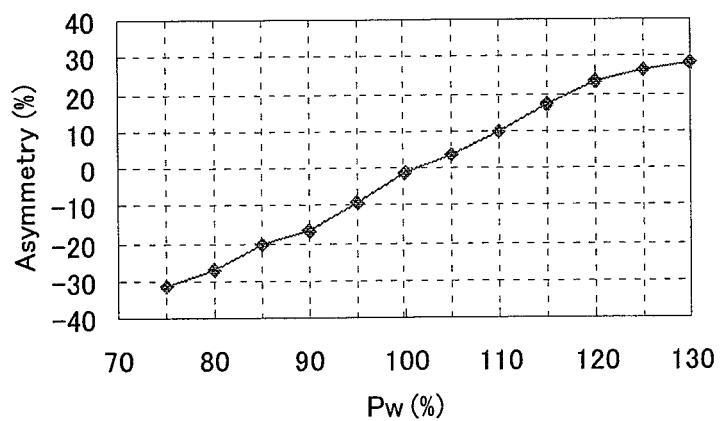
Figures 5, 6:
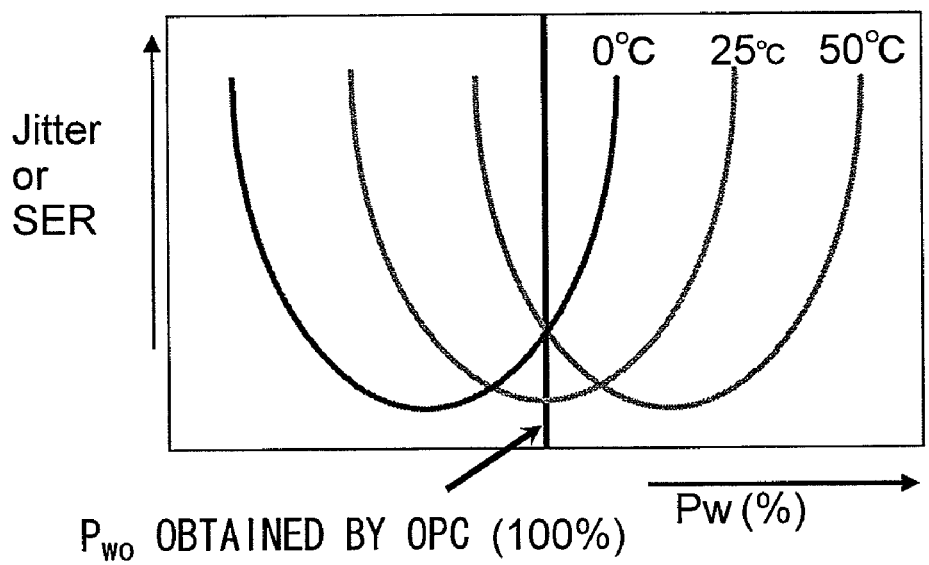
FIG. 5 is a view for showing a summary of suitable OPC methods in response to differences in recording materials.
FIG. 6 is a schematic view for showing results in which a power margin of a BD-RE disc is measured at every temperature, with write power found by using a κ-method set as 100%.

Next, as shown in FIG. 2, an estimation value Smn=Mm×Pwm in the κ-method is calculated, and a relational characteristic between correction recording power Pwm and the estimation value Smn is linearly approximated in the neighborhood of Mind (modulation recommended for discs), whereby recording power threshold Pthr is calculated, at which a modulation, i.e. an estimation value, is zero (S104). Subsequently, with reference to a temperature sensor value of a drive which is performing an OPC, the values κ and ρ depending on temperature thus referred are obtained from the table of FIG. 8 (S105).

By using the calculated recording power threshold Pthr and a multiplication coefficient obtained from the table of FIG. 8, by performing a calculation of the equation, Popt=κ×ρ×Pthr, the optimum recording power Popt is calculated (S106). Using the optimum recording power Popt thus determined, recording on a recording disc is performed.

Figure 10:
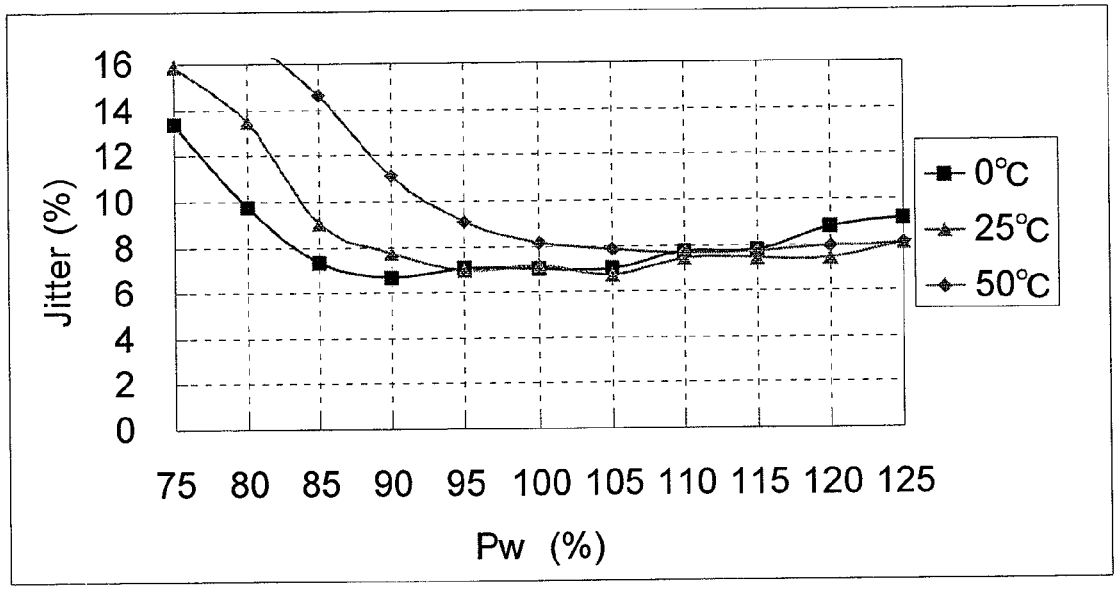
FIG. 10 is a view for showing a relationship between jitter and power margin.
Figure 10:
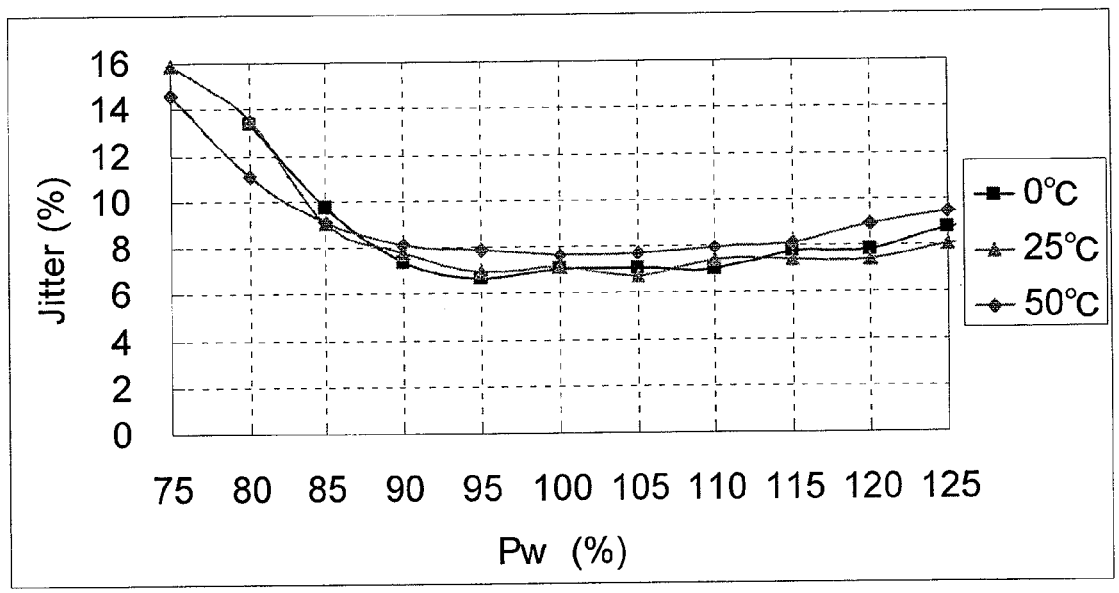
Figure 11:
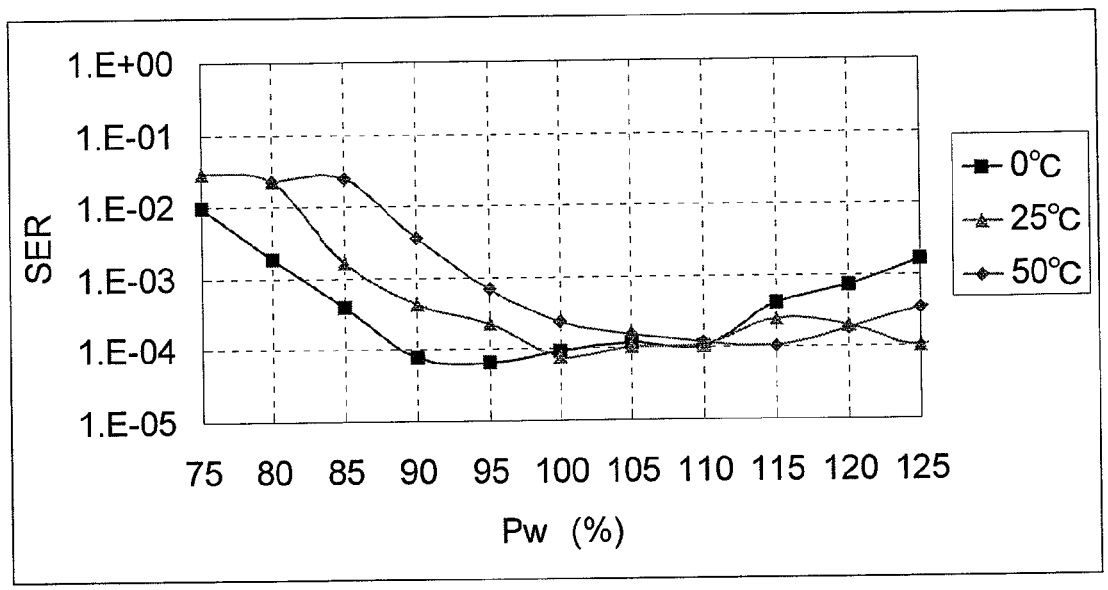
FIG. 11 is a view for showing a relationship between SER (Symbol Error Rate) and power margin.
Figure 11:
Figure 11:
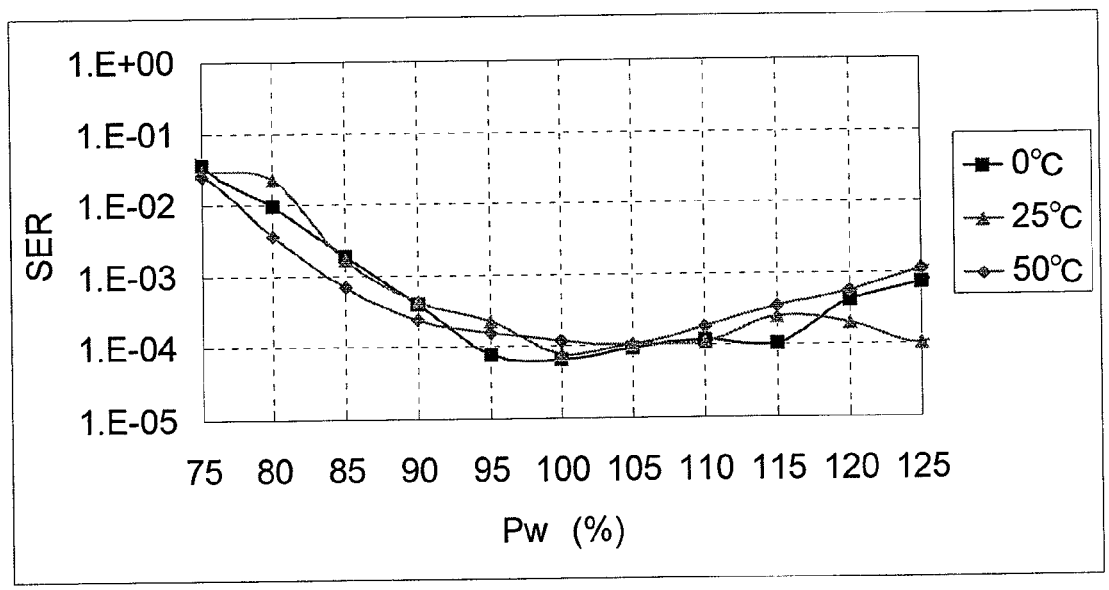

FIGS. 10 and 11 show results of relationships recorded using recording power found by the OPC of the present embodiment and measured at temperatures of 0° C., 25° C. and 50° C., the relationships being those between a jitter being a representative index for a recording quality, or symbol error rate (abbreviated as SER) and power margin. It can be seen that an improvement was made that, by introducing the table of FIG. 8, power margins at each temperature agree in jitter and SER. Specifically, by setting the multiplication coefficients κ and ρ to be temperature-dependent, a margin for temperature can be increased. This effect was confirmed on another disc. Furthermore, the effect that the multiplication coefficients are changed according to temperature is also effective for the γ-method using the same modulation; and, by changing the ρ value of Popt=ρ×Ptarget according to temperature as shown in FIG. 12, power margins at the time of recording can be set to be the same even when ambient temperatures are different.

Second Embodiment

Another embodiment is described in which multiplication coefficients are not fixed to temperatures but is variable with reference to asymmetry and modulation. In the present embodiment, no information is necessary from the temperature sensor.

Figures 12, 13:
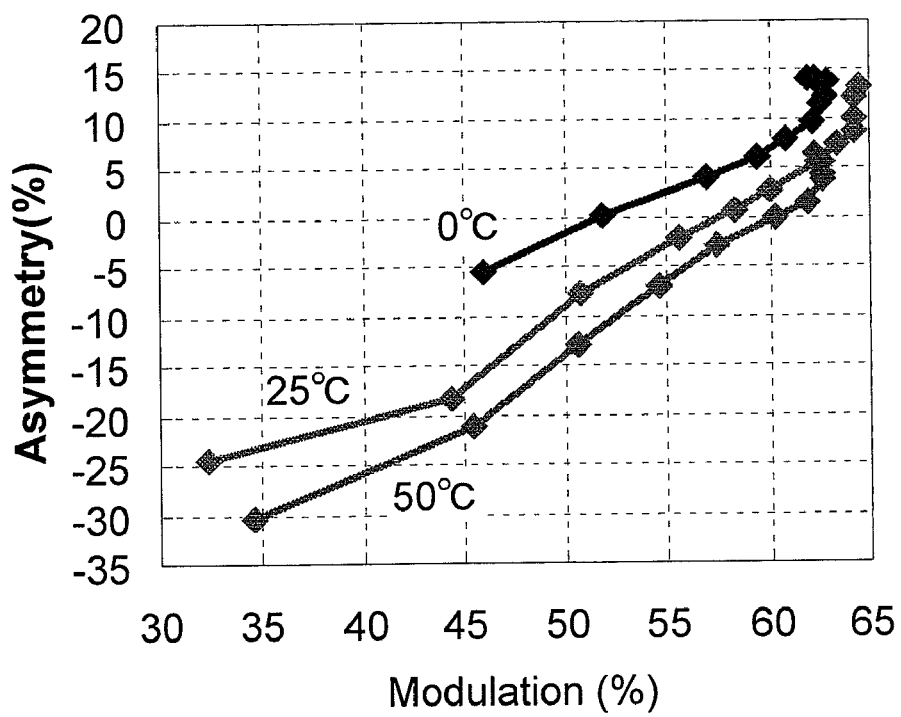
FIG. 12 is a view for showing an example of a table of multiplication coefficients of the γ-method of the present invention at each temperature.
FIG. 13 is a view for showing a result on a relationship between asymmetry and modulation measured at 0° C., 25° C. and 50° C.

FIG. 13 is a view for showing results of relationships between asymmetry and modulation measured at 0° C., 25° C. and 50° C. For example, where asymmetry is −5%, modulations are different at each temperature. In this embodiment, using this relationship, differences such as temperatures and recording states are detected, and optimum power is found by changing the coefficients κ and ρ.

Accordingly, for example, the values of the modulations when asymmetries measured by a standard drive apparatus are −5% and 0%, are tabulated in a reference database as standard values of the modulation, and stored in a memory area of control software. In mass-produced drive apparatuses, with reference to the reference data base, κ and ρ are changed as shown in FIG. 14.

In an example of FIG. 14, in a reference data base, the modulation M0 at which an asymmetry is −5% and the modulation M1 at which an asymmetry is 0% are registered. The degrees of modulations at which asymmetries are −5% and 0%, were measured by using a notable drive apparatus, and they were found to be Mm0 and Mm1. When the measured modulation Mm0 satisfies $0.98 \times M0 \leqq Mm0 \leqq 1.02 \times M0$, the standard values $κ_0$ and $ρ_0$ are used as the κ and ρ values used for the OPC of the κ-method. When the measured modulation Mm0 is less than $0.98 \times M0$, values that the standard values are multiplied by α, are used as the κ and ρ values. When the measured modulation Mm0 is greater than $1.02 \times M0$, values that the standard values are multiplied by β are used as the κ and ρ values. The values of α and β can be found experimentally. For Mm1, the same procedure as that for Mm0 is performed, so that the accuracy of the values, α and β, is raised by performing simple averaging, weighted averaging and the like.

Here, there is shown the example in which the values of modulations where asymmetries are −5% and 0% are held in the reference data base, but what is used in this example is applicable on condition that the rates of change in the modulation and the asymmetry due to a change in the recording power are small, i.e. the recording power is large.

Figure 15:
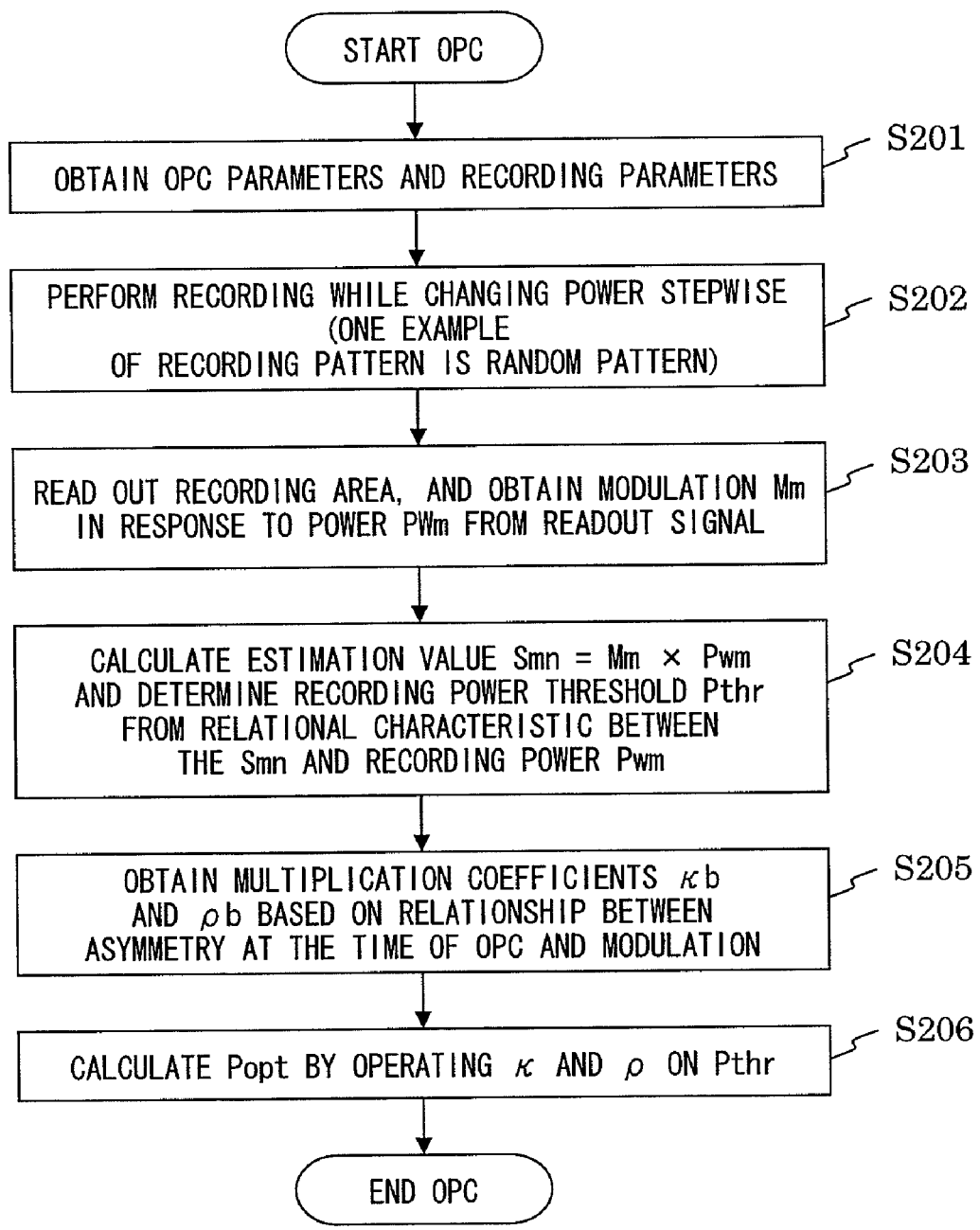
FIG. 15 is a flowchart for showing an example of a recording power determining method according to the present invention.

FIG. 15 is a flowchart for describing a method of determining recording power in the present embodiment. A sequence shown in FIG. 15 and standard data base shown in FIG. 16 are held in the memory 180 of the optical disc apparatus shown in FIG. 7 as a program. The CPU 140 executes the sequence shown in FIG. 15 using the program and table held in the memory 180.

First, to start the OPC, obtained are OPC parameters such as recording start power and recording termination power for a disc, and recording parameters such as power scan information and storage information (S201). Next, numerous kinds of recording powers PWm are set according to a predetermined condition; and predetermined signal patterns are recorded on a trial writing area of the optical disc by using each PWm (S202). In the present embodiment, since asymmetry equivalent amounts (asymmetry, β) are obtained later, the signal patterns to be recorded need to be random patterns or patterns mixed of a long mark and a short mark.

Next, an area where a trial writing is performed is reproduced, so that a high envelope (Henv) and a low envelope (Lenv) of readout signals corresponding to respective PWm are measured, and the modulation Mm, which is defined by an equation Mm=(Henv−Lenv)/Henv, is calculated (S203). Subsequently, as shown in FIG. 2, an estimation value Smn=Mm×Pwm in the κ-method is calculated, and a relational characteristic between correction recording power Pwm and an estimation value Smn is linearly approximated in the neighborhood of Mind (modulation recommended for discs), whereby recording power threshold Pthr is calculated at which the modulation, i.e. an estimation value, is zero (S204).

Next, since multiplication coefficients used at the time of calculating of OPC are determined not with reference to temperature measured by the temperature sensor as in the first embodiment but with reference to a recording state, an asymmetry equivalent amount ASYm (m is an integer) and modulation are obtained at the same time. Based on the relationship between measured ASYm and Mm, a difference from the standard data held in advance is figured out, whereby the values κ and ρ are obtained with reference to tables such as those in FIG. 14 (S205). Next, using calculated recording power threshold Pthr and the κ and ρ values thus obtained, an operation of the equation, Popt=κ×ρ×Pthr, is performed, whereby optimum recording power Popt is calculated (S206). Using the optimum recording power Popt thus determined, recording on a recording disc is performed.

The present embodiment is also applicable to the case where there are fluctuations in a temperature sensor; the case where there are fluctuations due to a drive when there are changes in temperature; and the like.

As described above, the method is described in which the rate of change of modulation is detected by setting the asymmetry as a reference, and thereby an operation value is changed. Another method is also considered in which the change in asymmetry is measured by setting the modulation as a reference, and thereby an operation value is changed. In this case, a reference database and a conversion table for κ and ρ values such as those shown in FIG. 16 instead of FIG. 14 may be used.

In an example shown in FIG. 16, in the case where the degrees of modulation measured by a reference drive apparatus are 35% and 40%, asymmetry values ASY0 and ASY1 are tabulated in a reference database as standard asymmetry values. In mass-produced drive apparatuses, κ and ρ are changed as shown in FIG. 16 with reference to the reference data base and a relationship between measured modulation and asymmetry. Specifically, in a notable drive apparatus, assuming that the asymmetry is ASYm0 when the modulation is 35% and that the asymmetry is ASYm1 when the modulation is 40%, when ASYm0 satisfies $0.98 \times ASY0 \leqq ASYm0 \leqq 1.02 \times ASY0$, the standard values $κ_0$ and $ρ_0$ are used as κ and ρ values to be used for an OPC of the κ-method. When the measured asymmetry ASYm0 is less than $0.98 \times ASY0$, values that the standard values are multiplied by α, are used as the κ and ρ values. Meanwhile, when the measured asymmetry ASYm0 is greater than $1.02 \times ASY0$, values that the standard values are multiplied by β are used as the κ and ρ values. The values, α and β, can be found experimentally. For ASYm1, the same procedure as that for ASYm0 is performed, so that the accuracy of the values, α and β, are raised by performing simple averaging, weighted averaging and the like.

The following methods in the present embodiment are effective also on the γ-method: the method in which the change in the modulation is detected by setting an asymmetry as a reference, and thereby an operation value is changed, or the method in which the change in asymmetry is measured by setting the modulation as a reference and an operation value is changed. By varying the value ρ of Popt=ρ×Ptarget as in the cases of FIGS. 14 and 16, power margins at the time of recording can be set to be the same values, even when ambient temperatures are different.

The present invention is applicable to high-capacity optical disc apparatuses which are compatible with optical discs having a recording layer.

What is claimed is:

1. An optical disc recording method comprising the steps of:

obtaining information which is necessary for finding optimum recording power of a laser;

recording, on a trial writing area of an optical disc medium, a data pattern for power correction while changing stepwise recording power according to the information thus obtained;

calculating a modulation in response to the recording power by using a readout signal obtained by reading out the data pattern;

determining first recording power using the modulation in response to the recording power;

measuring an ambient temperature of the optical disc medium;

finding multiplication coefficients depending on the ambient temperature; and finding the optimum recording power by multiplying the first recording power by at least one of the multiplication coefficients thus found;

wherein the first recording power is recording power threshold Pthr;

wherein the optimum recording power Popt is found by using an equation, Popt=ρ×κ×Pthr, where ρ and κ denote the multiplication coefficients; and wherein at least one of the multiplication coefficients ρ and κ is temperature-dependent.

2. An optical disc recording method comprising the steps of:

obtaining information which is necessary for finding optimum recording power of a laser;

recording, on a trial writing area of an optical disc medium, a data pattern for power correction while changing stepwise recording power according to the information thus obtained;

calculating a modulation in response to the recording power by using a readout signal obtained by reading out the data pattern;

determining first recording power using the modulation in response to the recording power;

measuring an ambient temperature of the optical disc medium;

finding multiplication coefficients depending on the ambient temperature; and finding the optimum recording power by multiplying the first recording power by at least one of the multiplication coefficients thus found;

wherein the first recording power is recording power Ptarget corresponding to a target rate of change in the modulation for the recording power changed stepwise;

wherein the optimum recording power Popt is found by using an equation Popt=ρ×Ptarget, where ρ denotes the multiplication coefficient; and wherein the multiplication coefficient ρ is temperature-dependent.

3. The optical disc recording method according to claim 1, wherein the data pattern for power correction is a data pattern including a repetition of a longest mark and space of a demodulation code to be used.

4. An optical disc recording method comprising the steps of:

obtaining information which is necessary for finding optimum recording power of a laser;

recording, on a trial writing area of an optical disc medium, a data pattern for power correction while changing stepwise recording power based on the information thus obtained;

calculating a modulation in response to the recording power by using a readout signal obtained by reading out the data pattern as well as an asymmetry equivalent amount;

determining first recording power by using the modulation in response to the recording power;

verifying a relationship between the modulation and the asymmetry equivalent amount with standard data held in advance, and finding multiplication coefficients in response to a difference deviated from the standard data; and finding the optimum recording power by multiplying the first recording power by at least one of the multiplication coefficients thus obtained.

5. The optical disc recording method according to claim 4, wherein the data pattern for power correction is a random pattern.

6. The optical disc recording method according to claim 4, wherein the first recording power is recording power threshold Pthr;

the optimum recording power Popt is finding by using an equation, Popt=ρ×κ×Pthr, where ρ and κ denote the multiplication coefficients;

and at least one of the multiplication coefficients ρ and κ is variable.

7. The optical disc recording method according to claim 4, wherein the first recording power is recording power Ptarget corresponding to a target rate of change of the modulation for the recording power changed stepwise;

the optimum recording power Popt is found by using an equation Popt=ρ×Ptarget, where ρ denotes the multiplication coefficient; and the multiplication coefficient ρ is variable.

8. An optical disc apparatus, comprising:

an optical head which includes a laser light source, an objective lens causing laser light from the laser light source to be converged on an optical disc medium, and a photodetector detecting laser light which is reflected by the optical disc medium, and which enters the objective lens;

means which holds a multiplication coefficient of an GPO method as a multiplication coefficient being temperature-dependent;

means which records, on a trial writing area of the optical disc medium, a data pattern for power correction while changing stepwise recording power of the laser light source;

means which calculates a modulation in response to the recording power by using a readout signal of the data pattern;

means which determines first recording power specific to the OPC method by using the modulation in response to the recording power;

means which measures an ambient temperature of the optical disc medium; and means which finds optimum recording power by multiplying the first recording power by a multiplication coefficient depending on the measured ambient temperature.

9. The optical disc apparatus according to claim 8, wherein the first recording power is recording power threshold Pthr;

the optimum recording power Popt is found at by using an equation, Popt=ρ×κ×Pthr, where ρ and κ denote the multiplication coefficients; and at least one of the multiplication coefficients ρ and κ is temperature-dependent.

10. The optical disc apparatus according to claim 8, wherein the first recording power is recording power Ptarget corresponding to a target rate of change in the modulation for the recording power changed stepwise;

the optimum recording power Popt is found by using an equation Popt=ρ×Ptarget, where ρ denotes the multiplication; and the multiplication coefficient ρ is temperature-dependent.

11. An optical disc apparatus, comprising:

an optical head which includes a laser light source, an objective lens causing laser light from the laser light source to be converged on an optical disc medium, and a photodetector detecting laser light which is reflected by the optical disc medium, and which enters the objective lens;

means which holds a relationship between a standard modulation and an asymmetry equivalent amount as standard data, and holding a relationship between a difference from the standard data and a value of a multiplication coefficient of an OPC method;

means which records, on a trial writing area of the optical disc medium, a data pattern for power correction while changing stepwise recording power of the laser light source;

means which calculates a modulation in response to the recording power using a readout signal obtained by reading out the data pattern;

means which determines first recording power specific to the OPC method by using the modulation in response to the recording power;

means which verifies a relationship between the modulation and the asymmetry equivalent amount with the standard data, and obtaining a multiplication coefficient corresponding to a difference deviated from the standard data; and means which finds optimum recording power by multiplying the first recording power by the multiplication coefficient thus obtained.

12. The optical disc apparatus according to claim 11, wherein the first recording power is recording power threshold Pthr;

the optimum recording power Popt is found by using an equation, Popt=ρ×κ×Pthr, where ρ and κ denote the multiplication coefficients; and at least one of the multiplication coefficients ρ and κ is variable.

13. The optical disc apparatus according to claim 11, wherein the first recording power is recording power Ptarget corresponding to a target rate of change in the modulation for the recording power changed stepwise;

the optimum recording power Popt is found by using an equation Popt=ρ×Ptarget, where ρ denote the multiplication coefficient; and the multiplication coefficient ρ is variable.

14. The optical disc recording method according to claim 2, wherein the data pattern for power correction is a data pattern including a repetition of a longest mark and space of a demodulation code to be used.

* * * * *